United States Patent [19]
Mitchell et al.

[11] Patent Number: 5,793,994
[45] Date of Patent: *Aug. 11, 1998

[54] SYNCHRONOUS EVENT POSTING BY A HIGH THROUGHPUT BUS

[75] Inventors: Bruce W. Mitchell, San Jose; James S. H. Cho, San Clara; Greg Walter, San Francisco; John H. Hughes, San Jose; Roger D. Rothhaar, Milpitas, all of Calif.

[73] Assignee: 3Com Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 594,868

[22] Filed: Jan. 31, 1996

[51] Int. Cl.⁶ .................................................. H01J 13/00
[52] U.S. Cl. ................... 395/306; 395/309; 395/869; 395/200.43; 395/290; 711/212
[58] Field of Search .......................... 395/306, 287, 395/290, 285, 292, 856, 857, 872, 874, 307, 309, 310, 421.02, 421.04, 823, 474, 477, 480, 824, 200.06, 200.07, 200.08, 200.11, 200.14, 200.16, 854, 855

[56] References Cited

U.S. PATENT DOCUMENTS

| 5,414,820 | 5/1995 | McFarland et al. | 395/287 |
|---|---|---|---|
| 5,423,008 | 6/1995 | Young et al. | 395/306 |
| 5,473,762 | 12/1995 | Krein et al. | 395/287 |
| 5,584,010 | 12/1996 | Kawai et al. | 395/444 |
| 5,588,125 | 12/1996 | Bennett | 395/306 |
| 5,594,875 | 1/1997 | Thaller | 395/287 |
| 5,594,882 | 1/1997 | Bell | 395/421.02 |
| 5,603,057 | 2/1997 | Allen et al. | 395/853 |
| 5,621,897 | 4/1997 | Boury et al. | 395/296 |
| 5,644,717 | 7/1997 | Clark | 395/200.11 |

*Primary Examiner*—Ayaz R. Sheikh
*Assistant Examiner*—Raymond N. Phan
*Attorney, Agent, or Firm*—Mark A. Haynes; Wilson, Sonsini, Goodrich & Rosati

[57] ABSTRACT

A bus protocol technique removes the transaction used for posting indications of events to the host processor from the bus. The invention takes advantage of the fact that addresses typically on a high speed bus contain fewer bits than the entire bus width. Particularly, for a 32 bit bus, the 32 bit address space is not always necessary. The remaining bits on the bus are used for an encoded event tag. A bus transaction involves a first bus transfer which provides an address for writing or reading data, along with the event tag. The event tag is detected and decoded by the destination, and the event is posted to the processor which monitors and responds to events, in a manner which is synchronous with completion of the transaction. Thus, after the transaction on the bus, the message subject of the transaction is waiting in the memory, and notification of the event has occurred automatically and synchronously with completion of the transfer.

27 Claims, 4 Drawing Sheets

SYNCHRONOUS EVENT POSTING BY A HIGH THROUGHPUT BUS

BACKGROUND OF THE INVENTION

1. Field of the Invention

The present invention relates to high speed bus systems in which one user of the bus must communicate indications of events to another user of the bus; and more particularly to high throughput input/output systems using such bus.

2. Description of Related Art

The performance of high throughput bus systems is largely dependent on management of the content of the actual bus transfers. Thus, in a system which involves transferring input/output data among a plurality of nodes on the bus, throughput for actual data is the critical parameter. Thus, a limitation on the number of bus transfers which provide only control information is one effective way of ensuring efficient use of the high throughput bus.

When the users of the high throughput bus comprise a number of input/output paths, which are subject of input/output events with random timing, the bus must support transfers of event indications to a central node which monitors and responds to those events. At any given time, the number and timing of events occurring can have a significant impact on bus throughput for actual data.

For example, one architecture for serving a plurality of input/output paths is based on the use of a shared memory resource, in which the driver for each of the paths writes data about events into the shared memory resource. For instance, data about events may be written into lists in the shared memory resource, which are read and processed by a host processor. In this system, the bus must be used twice for each new entry made to the list. First, the data must be written into the list using a first bus transfer, then a message must be sent to the host processor indicating that the list has been updated. The bus is used twice, and the event is subject to two waiting periods during which arbitration for the bus occurs, before a response to the event is made.

Accordingly, it is desirable to provide a bus protocol that makes more efficient use of the available bus transfer cycles.

SUMMARY OF THE INVENTION

The present invention provides a technique which removes the transaction used for posting indications of events to the host processor from the bus. The invention takes advantage of the fact that typically addresses on a high speed bus contain fewer bits than the entire bus width. Particularly, for a 32 bit bus, the 32 bit address space is not always necessary. The remaining bits on the bus are used according to the present invention for an encoded event tag. A bus transaction involves a first transfer which provides an address for writing or reading data along with the event tag. The event tag is detected and decoded at the destination, and the event is posted to the processor (for instance, by an interrupt or poll register) which monitors and responds to events, in a manner which is synchronous with completion of the bus transaction, such as upon receipt of a last bus transfer which carries data for the transaction. Thus, after the transaction on the bus, the data of the message is waiting in memory, and notification of the event has occurred automatically and synchronously with completion of the transfer.

Accordingly, the present invention can be characterized as an apparatus which processes data, comprising a bus including a set of data and address lines. A plurality of processing nodes are provided on the bus, in which at least one given processing node monitors and responds to events indicated by transactions on the bus from other processing nodes. The transactions on the bus include at least one bus transfer using the set of data and address lines. Bus transaction logic is coupled with the plurality of processing nodes. This logic supplies an event tag indicating that a transaction on the bus is an event to be posted to the given processing node. The logic further includes the event tag in a first subset of the set of data and address lines, and includes information relevant to the event, such as an address, on a second subset of the set of data and address lines, during a bus transfer for the transaction. Event posting logic is coupled with the bus, and posts the event, by for instance causing generation of an interrupt or writing a bit in an event polling register, in response to the event tag to the given processing node for the transaction. Whether an interrupt or polling is used for a given event may be set by programmable logic.

In one aspect of the invention, a bus transaction may include a first bus transfer carrying address information and the event tag, and a second bus transfer which carries data read or to be written in response to the address information. Event posting logic according to this aspect includes resources to synchronize posting of the event which is indicated by the event tag during the first bus transfer, with the completion, or some other action associated with, the last bus transfer in the transaction. The invention is also applicable to a "split transaction" bus, where the presentation of the address and event may be quite separate from the data transfer. This allows the event processing time to be "hidden". Another aspect is that an event which is not associated with data movement may be posted across the bus. In this case, the data transfer portion of the bus transaction may be omitted.

According to yet another aspect of the invention, an apparatus for managing transfer of data among the plurality of input/output paths is provided. The apparatus according to this aspect includes a bus having a set of data and address lines. A plurality of processing nodes are provided on the bus, in which at least a set of the processing nodes on the bus includes bus slave devices which are coupled to corresponding input/output paths in the plurality. Also, at least one given processing node on the bus comprises a shared memory which is accessed through the bus by the other processing nodes, and which has an address space defined by a number of address bits less than the number of lines in the set of data and address lines. In addition, a shared memory interface is included which includes a bus master coupled to the bus. The shared memory interface also includes a memory interface coupled to the shared memory and a host processor interface. The host processor is coupled to the host processor interface of the shared memory interface. The host processor monitors and responds to events indicated by transactions on the bus from other processing nodes to manage the transfer of data among the plurality of input/output paths. As discussed above, a particular transaction on the bus includes a plurality of bus transfers using the set of data and address lines, including a first bus transfer and one or more additional bus transfers. Bus transaction logic is coupled with the set of processing nodes, and supplies an event tag indicating that a transaction in the bus is an event to be posted to the given processing node. During the particular transaction, the bus transaction logic includes the event tag on a first subset of the set of data and address lines and address information for a location in the shared memory on a second subset of the set of data and address lines during the first bus transfer of the transaction. Event posting logic is coupled with the shared memory interface. This event posting logic posts the event to the host processor, in response to the event tag for the transaction, and includes resources to synchronize posting of the event with the last bus transfer in the plurality of bus transfers of the particular transaction. The event posting logic according to another aspect includes resources to synchronize posting of the event with a write to the memory of data from the last bus transfer, automatically so that the event is posted at the time of completion of the write, which is as soon as possible after data needed for responding to the event is ready for use. In one alternative, the event is posted early to allow the responding processor to prepare for the data. In another alternative, the event is posted later to allow other following events or transactions to occur before the responding processor is interrupted.

The memory according to one architecture stores a list indicating actions occurring in the set of processing nodes, and the particular transaction may comprise an update to such list. Thus, the first bus transfer carries an address to a location in the list, and the additional bus transfer or transfers, if used, in the particular transaction carry data to be written into the list at the identified address. The host processor reads the data from the memory when servicing the event.

Accordingly, a high throughput bus system is improved by a protocol using synchronous event posting according to the present invention. The invention is particularly useful in systems providing high throughput transfers of data among the plurality of input/output paths, such as are encountered in network intermediate systems interfacing between the plurality of data networks.

Other aspects and advantages of the present invention can be seen upon review of the figures, the detailed description, and the claims which follow.

DETAILED DESCRIPTION

Figure 1:
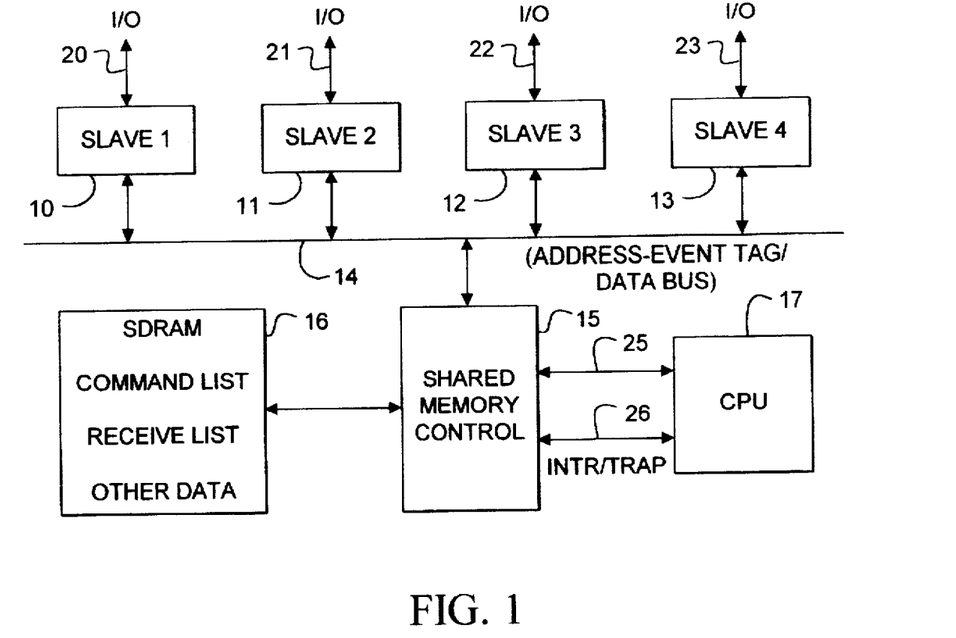
FIG. 1 is a block diagram of a data processing system using the synchronous event posting according to the present invention.

A detailed description of preferred embodiments of the present invention is provided with reference to FIGS. 1 through 7. FIG. 1 illustrates a setting in which the present invention is applied. In particular, a plurality of data processing nodes including a first slave device 10, a second slave device 11, a third slave device 12, and a fourth slave device 13 are coupled to a high speed address-event tag/data bus 14. A bus master which comprises a shared memory control resource 15 coupled to the bus 14, a shared memory 16 coupled to the shared memory control resource 15, and a host CPU 17 coupled to the shared memory control resource 15, provides an additional processing node on the bus.

Between the shared memory control resource 15 and the host CPU 17 are found the bus 25, and the interrupt and trap signal lines 26. The interrupt and trap signal lines are used by the shared memory control resource 15 to signal the CPU 17 of interrupt and traps. Thus, the events indicated by the event tag on the bus 14 may be translated into interrupt or trap signals on lines 26 for use by the CPU 17. Alternatively, the events may be posted in an event register, which is periodically polled by the CPU 17.

In the embodiment of FIG. 1, each of the slave devices 10 through 13 is coupled to a corresponding input/output path 20, 21, 22, 23. In some embodiments, each slave device may be coupled to a number of separate input/output paths, or to other resources which result in random or asynchronous events which must be handled by the processing node on the bus 14. For instance, the input/output paths 20 through 23 may comprise network interfaces connected to local area networks, wide area networks, network intermediate systems or the like which involve asynchronous data transfer activity carrying large amounts of data which must be transferred among the paths.

The host CPU 17 according to this aspect of the invention manages the transfer of data among the slave devices 10 through 13 and the input/output paths 20 through 23 using the shared memory 16. In one preferred architecture, the shared memory 16 stores a list or lists which are used to communicate among the processing nodes on the device. Thus, there may be a command list, in which commands are written by the host CPU 17 for execution by the slave devices 10 through 13. When a slave device reads a command from the command list in the memory 16, it executes the command and then optionally notifies the host 15 by sending an event via the bus 14.

Also, the shared memory 16 may store a receive list, in which slave devices write descriptions of received data which is written into the shared memory 16. Thus, when a slave device, such as slave device 10 receives a packet of data from its input/output path 20, the packet is written into buffers in the shared memory 16, and the receive list is written with a descriptor of the buffers used for the transfer.

On either of these events, completing a command list entry or writing a new descriptor into the receive list, the slave device may also notify the host CPU 17 that the event has occurred. The host device monitors and responds to these events as appropriate to manage the flow and routing of the input/output data in the device.

Figure 2:
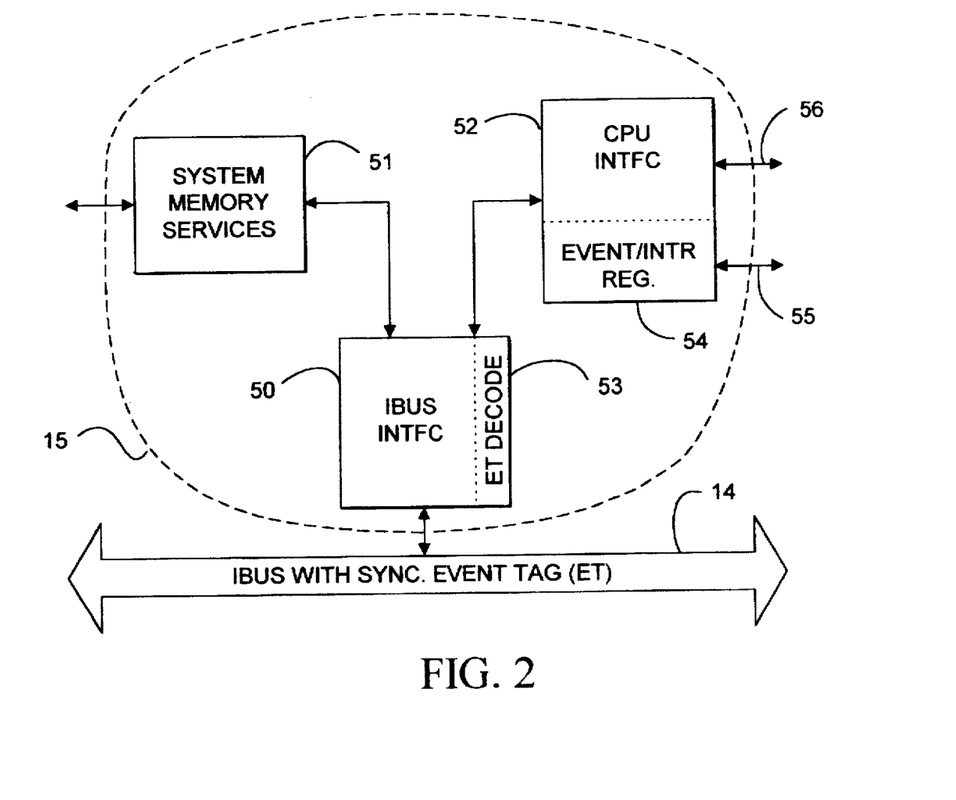
FIG. 2 is a block diagram of a shared memory control resource for the system in FIG. 1.

FIG. 2 provides a simplified block diagram of the shared memory control resource 15. As mentioned above, the shared memory control resource 15 acts as a bus master on the bus 14. The bus 14 operates as an internal bus with a synchronous event tag (ET) according to the present invention. Thus, the shared memory resource 15 includes an internal bus interface 50, system memory services 51, and a CPU interface 52. The internal bus interface 50 includes the event tag decode logic 53, and communicates with the CPU interface 52 to post events in an event/interrupt register 54 within the CPU interface 52. The system memory services 51 provide interface services for reading and writing data into the shared memory 16. According to a preferred embodiment, the shared memory 16 comprises a large scale synchronous dynamic random access memory (SDRAM), such as a set of JEDEC compliant devices from various manufacturers.

The event/interrupt register 54 communicates across line 55 with the host CPU 17, driving the dedicated interrupt or trap pins for the CPU as appropriate. The CPU interface 52 also includes a bus 56 managing other pins on the CPU. In one embodiment, the event/interrupt register is coupled to programmable logic, such as, mask logic, for selectively causing an interrupt or writing an event polling register in response to particular events.

FIGS. 3 through 6 illustrate operation of a preferred embodiment of the internal bus 14 used according to the present invention. The internal bus 14 allows the flow of data and control information between the processing nodes on the bus. Most often, transfers are requested by one of the slave devices 10 through 13 and involve the transfer of data to and from the memory 16. Slave devices 10 through 13 buffer transfer data so as to use efficient burst transfers on the internal bus and into the memory. In addition to memory data transfers, the internal bus 14 can be used for explicit interrupt and event notification, and for accesses from the host CPU 17 to the slave devices 10 through 13, such as used for configuration and the like. According to one embodiment of the present invention, the internal bus 14 includes a 32 line set of shared data and address lines. The bus operates at 50 megaHertz or higher. A single bus master resides in the shared memory control resource 15. The system supports split transactions, allowing multiple requests to be queued to the shared memory control resource 15.

Internal bus signal definition according to a preferred embodiment of the present invention is provided as follows:

A/D [31:0] 32-bit multiplexed bidirectional address/data bus.
Three-state synchronous.

REQ [3:0] Request lines: one line per Channel Device (slaves 10–13) and driven by same. Continuously driven, synchronous.

HREQ [3:0] Hi-priority Request lines: one line per Channel Device and driven by same. Continuously driven, synchronous.

CMD [4:0] An encoded Command State for the bus. Driven only by the Bus Master and monitored by each Channel Device. The Bus Master used the CMD field to instruct a Channel Device to drive its request address information or data onto the bus or to receive valid data in response to an earlier request. Also, the Bus Master may initiate transfers to a specific Channel Device. The Bus Master addresses commands to a specific channel using the two lsb's of the CMD field.

R/$\overline{\text{W}}$ Read/Write: a shared control line driven during request phase of the bus. Read/write is determined from the requestor's perspective.

CNT/BE[3:0] Count/Byte Enable:
During request phase, this field specifies the length in words of requested data transfer. This is a count field; a value of 0×1 hex means a single-word (or pword) transfer, 0×2 hex means two words, and so forth up to 0×F hex for fifteen words. A zero value indicates a 16-word transfer.
During the data phase, the CNT/BE indicates the bytewise validity of each word transferred. BE(3) is associated with the A/D(31:24), and so on.

BUSY An open-drain line which may be pulled low by any of the Channel Devices. This line is used by a Channel Device to hold off the data transfer portion of a delayed-response master-initiated IBUS transfer.

$\overline{\text{IERR}}$ An open-drain line which may be pulled low by any of the Channel Devices. When this line is pulled low it is letting the Bus Master know to abort the master initiated request.

The bus according to this aspect of the invention includes two request lines per slave device, six lines to carry a six bit command for bus operation, 32 lines for the shared address and data lines, four lines carrying a count/byte enable signal, one line carrying a read/write signal. No additional lines are needed for the event tag.

Figure 3:
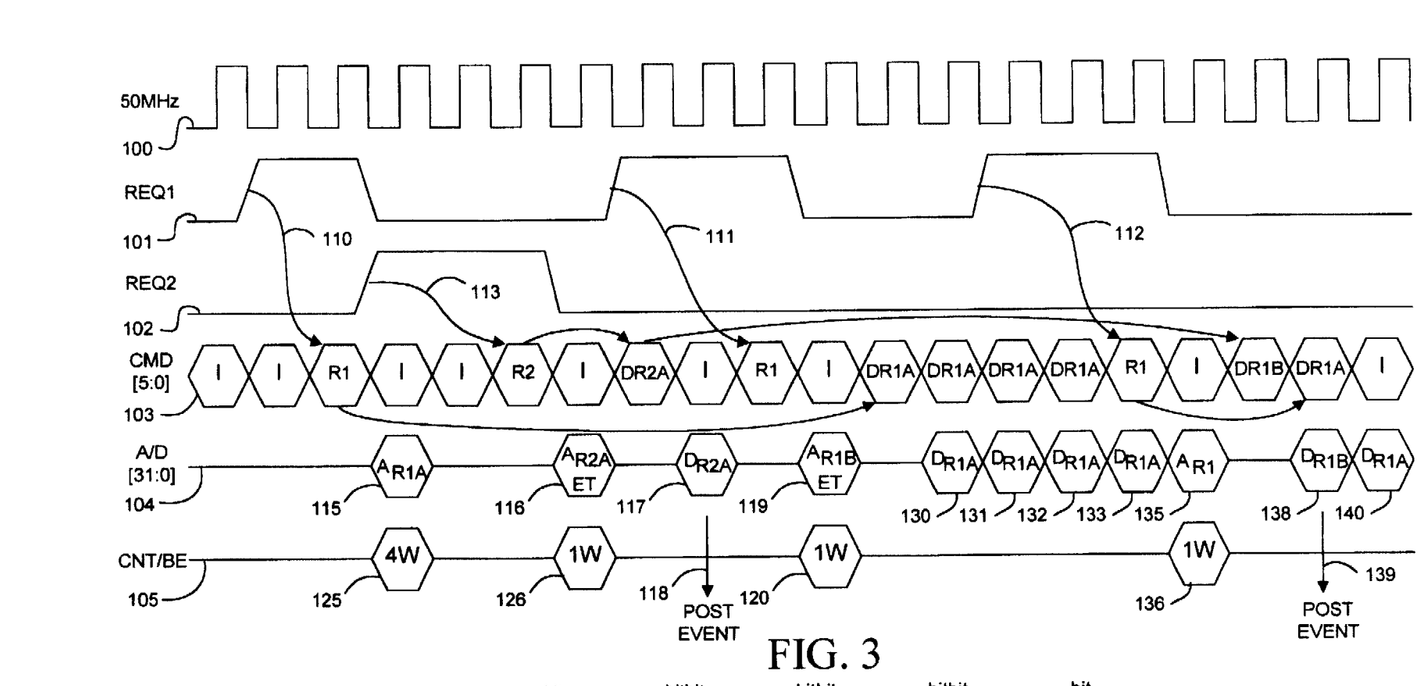
FIG. 3 is a bus timing diagram illustrating operation of the high speed bus according to the present invention.

FIG. 3 shows the timing for the split transaction bus assuming two slave devices on the bus. Thus, the 50 megaHertz bus clock is shown on trace 100. The request line for a first slave REQ1 is shown on trace 101. The request line for a second slave REQ2 is shown on trace 102. The command field for the bus is shown in trace 103. The address and data line field is shown on trace 104. The count/byte enable field is shown on trace 105. FIG. 3 shows three requests at points 110, 111, 112, from the first slave device, with a request 113 from the second slave device interleaved between requests 110 and 111 from the first device. The bus command line state is idle I until the bus cycle immediately following the request 110. At this point, the bus master will reply to the first request with the reply R1. The first slave device in the next bus cycle supplies the address information for the first request $A_{R1A}$ in the field 115. At the same time as driving the address information in the bus transfer 115, the count and byte enable field for this example indicates a four word transfer at point 125. When the second slave device issues its request at point 113, the bus master will reply to the request as soon as the arbitration logic allows with the reply command R2. In the following cycle, the second slave device supplies address information $A_{R2A}$ along with an event tag ET at point 116. Along with the address information and the event tag during the bus transfer 116, the count/byte enable field indicates a one word transfer at point 126. Because of the split transaction of the bus, the request 113 from the second slave may complete before the request 110 from the first slave. Thus, in the example shown in FIG. 3, the bus master issues a request for data DR2A in the cycle immediately following the address transfer 116 for the second request. The second slave device responds with the bus transfer carrying the data $D_{R2A}$ in the field 117. According to the present invention, because the event tag ET was carried during the bus transfer 116, the event indicated is posted synchronously with the last bus transfer 117 in the transaction as indicated by the arrow 118.

Continuing in the sequence, the first slave issues a request 111 before completion of the first bus transaction corresponding to the request 110. In this example, the bus master responds with the command R1, and the first slave replies with the bus transfer 119 carrying address information $A_{R1B}$ and the event tag ET, along with the count/byte enable signal 120 indicating a one word transfer. In the next cycle, the bus master issues the command DR1A requesting a data transfer in response to the first request 110. The slave device responds with the sequence of data transfers 130 through 133 to complete the first transaction. In this example, the third request 112 by the first slave on trace 110 is issued during the bus transfers 130 through 133. On the next available bus cycle, the bus master responds with the command R1, and the slave device supplies the address information $A_{R1A}$ during bus transfer 135 and the count/byte enable information 136. The bus master then issues the DR1B command and the first slave device responds with the bus transfer 138 carrying the data for the transaction initiated by request 111. Because the bus transfer 119 carried an event tag, upon completion of the bus transfer 138 the event is posted to the host CPU as indicated by arrow 139.

The last bus request 112 from the first slave is then completed when the bus master issues the DR1C command and the slave device responds with the bus transfer 140 carrying the data $D_{R1C}$.

As can be seen, the split transaction nature of the bus allows for more efficient utilization of the bus resources by interleaving transactions originating from separate slave devices, by interleaving the bus transfers of given transactions with transfers of other transactions, and by supporting sub-channels to allow more than one pending transaction at a time from each channel of a single slave.

Figure 4:
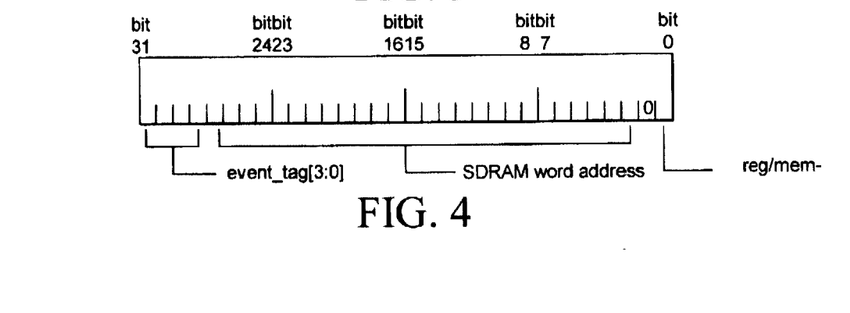
FIG. 4 is a map of the bus lines used during a bus transfer carrying an event tag according to one embodiment of the present invention.

FIG. 4 provides the address definition for the 32 bits of the shared address and data lines during a bus transfer carrying the address according to one embodiment of the invention. The event tag is a four bit field carried in bit positions |31:28| of the 32 bit address. The word address for the synchronous dynamic random access memory 16 is carried in bit positions |27:2|. Bit |1| is always set at zero and bit position |0| indicates whether the address is a register transfer or a memory transfer.

Figure 5:
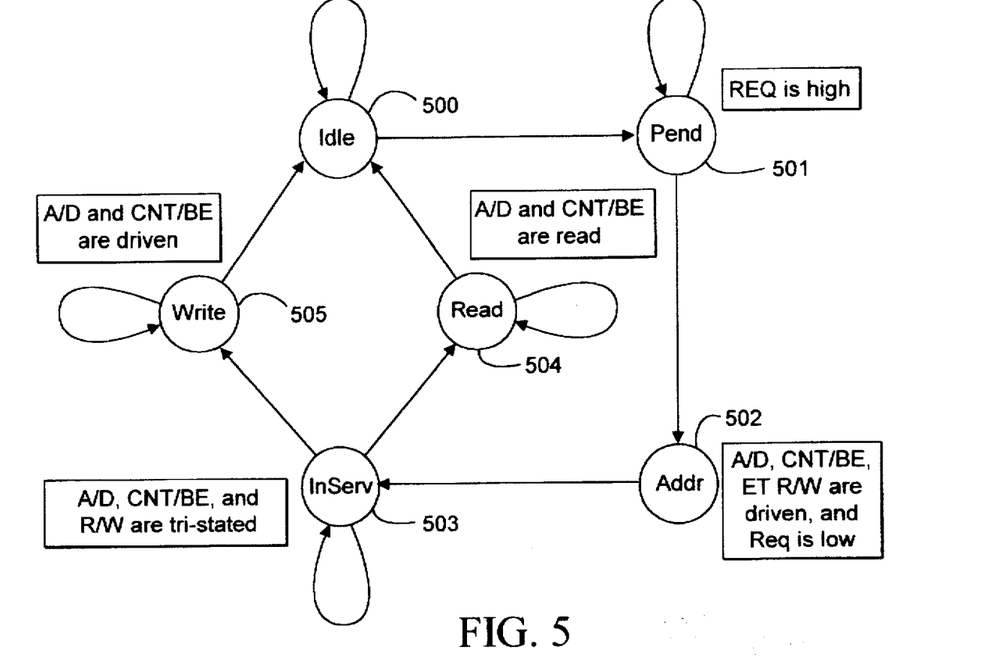
FIG. 5 is a state diagram for bus transaction logic requesting access to the bus.
Figure 6:
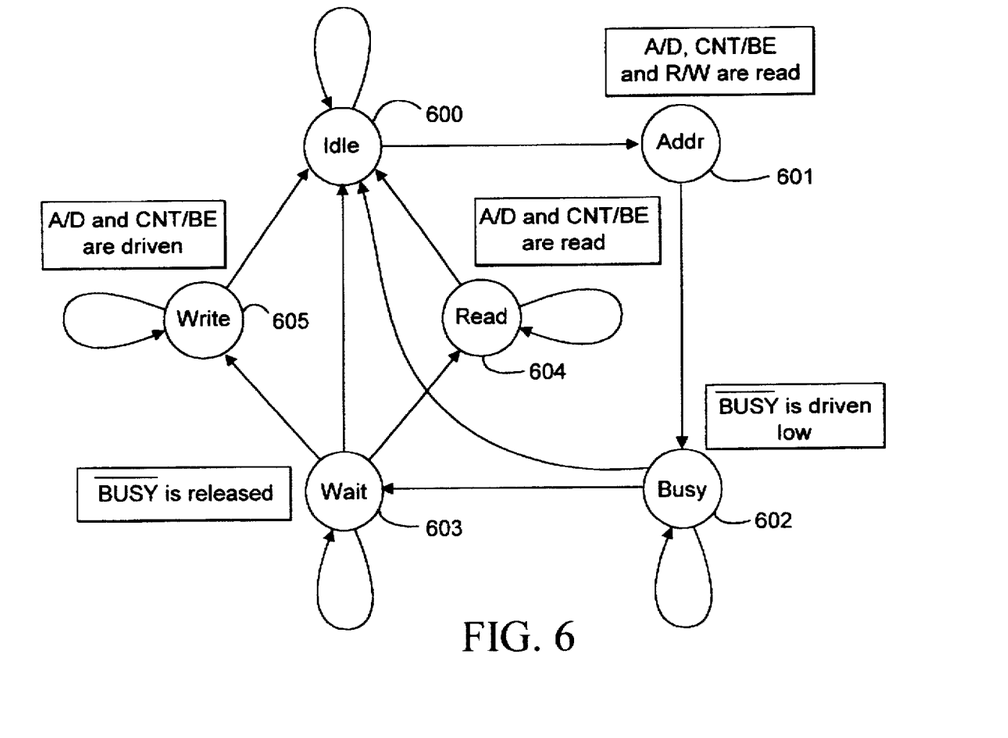
FIG. 6 is a state diagram for the bus transaction logic for a device replying to bus master commands.

Each slave device 10 through 13 according to the present invention includes bus transaction logic including a request module and a replier module for transactions on the bus. FIGS. 5 and 6 illustrate the states for the request module and the replier module respectively. The states associated with a given internal bus data request in FIG. 5 include the following:

Idle 500 This starting point of the channel request. The controller stays in this state until an internal module has requested access to the bus and has noticed that the request line has been down for at least one cycle.

Pend 501 When the controller goes from the "Idle" to the "Pend" state, the REQ or HREQ line goes high indicating that a request for transfer has been presented on the bus, but has not the been acknowledged by the Master Device. The controller stays in this state until the Master Device gives an acknowledge request command (R# or H#).

Addr 502 When the Master Device command is a request acknowledge, the state will go from "Pend" to "Addr" and the A/D lines will carry the address and event tag, if any, CNT/BE lines will carry the count information, R/$\overline{W}$ line will be driven high for a read and low for a write by the Channel Device and the request line will be dropped low. The channel controller stays in this state for only one cycle.

InServ 503 After the Master Device has acknowledged the request is in-service which means that until the Master Device needs some time to get ready to do the data transfer. Until this time, the controller is idle.

Read 504 or Write 505 After the data acknowledge command is given, which corresponds to the data transfer request, the controller will go into the "Read" or "Write" state depending on whether the R/W signal is driven high or low during the "Addr" state. In either the "Read" or "Write" state, the data is transferred at one-word-per-clock rate until all words are transferred.

Idle 500 Once all words are transferred, the bus transfer is complete and the requestor goes back to the "Idle" state, where it is waiting for a new internal request and the request line being down.

The state diagram in FIG. 5 shows the request states for a single bus transaction. There are multiple state machines within each bus transaction logic module so that multiple requests may be maintained.

FIG. 6 illustrates the bus replier module in the bus transaction logic on the slave devices. The states in the replier module include the following:

Idle 600 The state of the bus replier module in initially idle waiting for a master initiated command.

Addr 601 When bus Master asserts a command code the state goes from "Idle" to "Addr". In this cycle the address, count, and read/write lines are read off the bus. This state only lasts one cycle and the state becomes "Busy".

Busy 602 The Channel device enters this state to hold off the data transfer phase of this bus transfer. Bus operation may continue for other Channel Device requests, but no further Master-initiated (MI) requests may begin until the Channel Device goes non-busy and the MI transfer completes. At any time in the "Busy" or "Wait" states, the Master Device can send a cancel command which resets the master initiated command and sends the state back to "Idle". This cancel command may be caused by a timeout by the master or by the $\overline{IERR}$ line to be pulled down by the Channel Device.

Wait 603 After the BUSY line goes back up, the replier enters the wait state 603 to allow some time for the Master Device to be ready for a data transfer.

Read 604 or Write 605 The Master Device sees that the Channel Device is not busy and asserts a command code to indicate data transfer on the A/D lines.

Idle 600 After the data has all been transferred, the replier module goes back into the "Idle" state.

Figure 7:
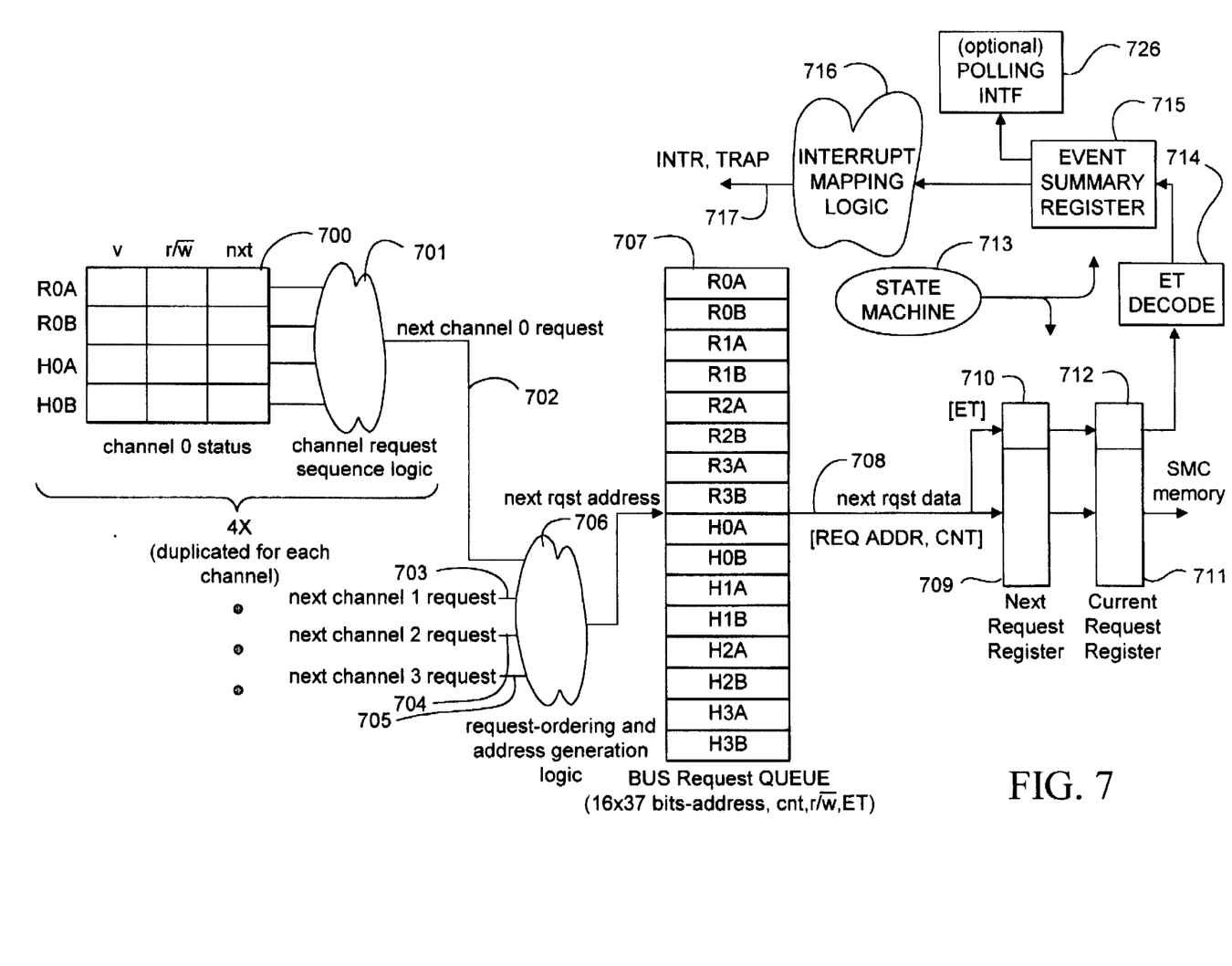
FIG. 7 is a block diagram of one embodiment of a shared memory interface with event posting logic according to the present invention.

FIG. 7 illustrates the request queue maintained in the shared memory control resource, with the synchronous event posting logic according to the present invention. The bus master maintains a queue of up to sixteen in service internal bus transactions, including one transaction queue for each channel, such as queue 700 for channel 0. For each channel, there are two normal requests R0A, R0B, and two high priority requests H0A and H0B stored in the queue. The status bits for each transaction include "v" which indicates whether the request is valid, "r/$\overline{w}$" which indicates whether the transaction is a read or write request, and "next" which indicates whether sub-channel A or B should be serviced first. The queues feed channel request sequence logic 701 which decides which of the four requests should be handled next for the given channel. For a four channel system, the four next channel request signals are supplied on lines 702, 703, 704, and 705 into a request ordering and address generation logic 706. This logic 706 decides which of the channel requests should be handled next. The address, count, read/write information and the event tag if any for the next request are stored in a request queue 707 which consists of a 16 entry by 37 bit memory. The next request data is supplied on line 708 to a next request register 709 which includes an event tag field 710. This data is staged through a current request register 711 carrying the event tag in field 712 as appropriate. When the current request is serviced under control of the state machine 713, such as by initiating the transfer to the synchronous dynamic random access memory 16, the event tag is decoded in event tag decoding logic 714 and supplied to an event summary register 715. The event summary register 715 is interpreted using interrupt mapping logic 716 which generates an interrupt or trap signal on line 717 synchronous with completion of the transfer to memory from the current request register 711. The interrupt mapping logic in one alternative includes resources for delaying or accelerating the event posting in specified circumstances or for specific kinds of events. Similarly, the event tag decoder may be positioned earlier in the sequence, such as coupled with the request ordering and address generation logic 706. In an alternative, the interrupt mapping logic 716 is replaced or supplemented with an event polling interface 725 used by the host to poll data in or from the event summary register on a periodic basis. Further, programmable logic can be used to direct events to one or both of the polling interface or the interrupt mapping logic.

Accordingly, with the shared memory control resource functioning as a bus master for the internal bus, synchronous event posting logic of the present invention increases throughput for the high speed bus. To eliminate the need for a second transaction indicating to the host processor that an event has occurred which needs its attention, an event tag is encoded with a bus transfer within the transaction that writes data into the shared memory. The encoded command is processed synchronously with the end of the transaction being processed. Thus, the host processor is notified of the event in the most efficient manner, and bus throughput is preserved for critical data input/output transfers.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for processing data, comprising:
    a bus including a set of data and address lines;
    a plurality of processing nodes on the bus, in which at least one given processing node in the plurality of processing nodes monitors and responds to events indicated by transactions on the bus from other processing nodes, wherein the indicated events comprise events which occur at processing nodes in the plurality of processing nodes asynchronously relative to the transactions on the bus, and transactions on the bus include at least one bus transfer using the set of data and address lines to transfer at least a portion of one of an address and data for the transactions;
    bus transaction logic, coupled with the plurality of processing nodes, which supplies an event tag indicating that a transaction on the bus carries information about one of the events which occurred asynchronously relative to the transaction on the bus, to be posted to the given processing node, and which during a bus transfer includes the event tag on a first subset of the set of data and address lines, the event tag including an indication other than the address and the data of the transaction, and information comprising at least a portion of one of the address and the data of the transaction on a second subset of the set of data and address lines; and
    event posting logic, coupled with the bus, which posts the event in response to the event tag to the given processing node for the transaction.

2. The apparatus of claim 1, wherein the transaction includes a plurality of bus transfers using the set of data and address lines, and the event posting logic includes resources to synchronize posting of the event with a last bus transfer in the plurality of bus transfers.

3. The apparatus of claim 1, including:
    memory, accessed by the plurality of processing nodes through the bus, having an address space defined by a number of address bits less than the number of lines in the set of data and address lines; and
    wherein the transaction includes a first bus transfer carrying an address within the address space and the event tag, and at least one additional bus transfer or transfers carrying data to be written in response to the address in the first bus transfer; and
    the event posting logic includes resources to synchronize posting of the event with a write to the memory of data from a last bus transfer of the additional bus transfer or transfers.

4. The apparatus of claim 1, wherein the set of data and address lines comprises lines used for both address and data transfers.

5. The apparatus of claim 1, wherein the given processing node comprises a bus master.

6. The apparatus of claim 1, wherein the event posting logic includes an event polling interface.

7. The apparatus of claim 1, wherein the event polling logic includes interrupt mapping logic responsive to the event.

8. The apparatus of claim 1, wherein the event posting logic includes programmable interrupt and polling logic which posts events as either an interrupt or a write to a polling interface.

9. The apparatus of claim 2, wherein the transaction includes a first bus transfer carrying at least a portion of the address of the transaction and the event tag, and a second bus transfer carrying data read or to be written in response to the address information in the first bus transfer.

10. The apparatus of claim 3, wherein the given processing node includes a shared memory interface coupled to the memory, and a host processor interface coupled to a host processor, and wherein the host processor monitors and responds to the events posted by the event posting logic.

11. An apparatus for processing data, comprising:
    a bus including a set of data and address lines;
    a plurality of processing nodes on the bus, in which at least one given processing node in the plurality of processing nodes monitors and responds to events indicated by transactions on the bus from other processing nodes, wherein the indicated events comprise events which occur at processing nodes in the plurality of processing nodes asynchronously relative to the transactions on the bus, and a particular transaction includes a plurality of bus transfers using the set of data and address lines, includes a first bus transfer and one or more additional bus transfers;
    bus transaction logic, coupled with the plurality of processing nodes, which supplies an event tag indicating that a transaction on the bus carries information about one of the events which occurred asynchronously relative to the transaction on the bus, to be posted to the given processing node, and which during the particular transaction includes the event tag on a first subset of the set of data and address lines and information relevant to the event on a second subset of the set of data and address lines in one of the plurality of bus transfers; and
    event posting logic, coupled with the bus, which posts the event in response to the event tag to the given processing node for the transaction, and includes resources to synchronize posting of the event with an action associated with a last bus transfer in the plurality of bus transfers to the particular transaction.

12. The apparatus of claim 11, wherein the plurality of bus transfers in the particular transaction includes a first bus transfer and one or more additional bus transfers and the event tag is supplied by the bus transaction logic in the first bus transfer of the particular transaction.

13. The apparatus of claim 11, wherein the plurality of bus transfers in the particular transaction includes a first bus transfer and one or more additional bus transfers and the first bus transfer of the particular transaction carries address information and the event tag, and the at least one additional bus transfer or transfers carries data read or to be written in response to the address information in the first bus transfer.

14. The apparatus of claim 11, including:

memory, accessed by the plurality of processing nodes through the bus, having an address space defined by a number of address bits less than the number of lines in the set of data and address lines; and wherein the plurality of bus transfers in the particular transaction includes a first bus transfer and one or more additional bus transfers and the first bus transfer in the particular transaction carries an address within the address space and the event tag, and at least one additional bus transfer or transfers carries data to be written in response to the address in the first bus transfer; and the event posting logic includes resources to synchronize posting of the event with a write to the memory of data from a last bus transfer of the additional bus transfer or transfers.

15. The apparatus of claim 11, wherein the event posting logic includes an event polling interface.

16. The apparatus of claim 11, wherein the event posting logic includes interrupt mapping logic responsive to the event.

17. The apparatus of claim 11, wherein the event posting logic includes programmable interrupt and polling logic which posts events as either an interrupt or a write to a polling interface.

18. The apparatus of claim 14, wherein the given processing node includes a shared memory interface coupled to the memory, and a host processor interface coupled to a host processor, and wherein the host processor monitors and responds to the events posted by the event posting logic.

19. The apparatus of claim 18, wherein the other processing nodes in the plurality of processing nodes comprise input/output devices coupled to respective data channels, and in which the indicated events comprise asynchronous input/output events in the respective data channels.

20. The apparatus of claim 19, wherein the particular transaction comprises a write to a location in the memory used for storing information about events monitored by the host processor.

21. An apparatus for managing transfer of data among a plurality of input/output paths, comprising:

a bus including a set of data and address lines;

a plurality of processing nodes on the bus, a set of the plurality of processing nodes on the bus coupled to corresponding input/output paths in the plurality of input/output paths, and at least one given processing node in the plurality of processing nodes comprising shared memory, accessed by the plurality of processing nodes through the bus, having an address space defined by a number of address bits less than the number of lines in the set of data and address lines; and a shared memory interface including a bus master coupled to the bus, a memory interface coupled to the memory, and a host processor interface;

a host processor, coupled to the host processor interface of the shared memory interface, wherein the host processor monitors and responds to events indicated by transactions on the bus from other processing nodes to manage the transfer of data among the plurality of input/output paths and the indicated events comprise events which occur at the other processing nodes asynchronously relative to the transactions on the bus;

wherein a particular transaction on the bus for accessing the shared memory includes a plurality of bus transfers using the set of data and address lines, including a first bus transfer and one or more additional bus transfers;

bus transaction logic, coupled with the set of processing nodes in the plurality of processing nodes, which supplies an event tag indicating that a transaction on the bus carries information about one of the events which occurred asynchronously relative to the transaction on the bus, to be posted to the given processing node, and which during the particular transaction includes the event tag on a first subset of the set of data and address lines and address information for a location in the shared memory on a second subset of the set of data and address lines in the first bus transfer; and event posting logic, coupled with the shared memory interface, which posts the event in response to the event tag to the host processor for the transaction, and includes resources to synchronize posting of the event with an action associated with a last bus transfer in the plurality of bus transfers of the particular transaction.

22. The apparatus of claim 21, wherein the additional bus transfer or transfers in the particular transaction carry data to be written in response to the address information in the first bus transfer, and wherein the host processor reads the data from the memory when servicing the event.

23. The apparatus of claim 21, wherein the event posting logic includes resources to synchronize posting of the event with a write to the shared memory of data from a last bus transfer of the additional bus transfer or transfers.

24. The apparatus of claim 21, wherein the event posting logic includes an event polling interface.

25. The apparatus of claim 21, wherein the event posting logic includes interrupt mapping logic responsive to the event.

26. The apparatus of claim 21, wherein the posting logic includes programmable interrupt and polling logic which posts events as either an interrupt or a write to a polling interface.

27. An apparatus for managing transfer of data among a plurality of input/output paths, comprising:

a bus including a set of data and address lines;

a plurality of processing nodes on the bus, a set of the plurality of processing nodes on the bus coupled to corresponding input/output paths in the plurality of input/output paths, and at least one given processing node in the plurality of processing nodes comprising shared memory, accessed by the plurality of processing nodes through the bus, having an address space defined by a number of address bits less than the number of lines in the set of data and address lines; and a shared memory interface including a bus master coupled to the bus, a memory interface coupled to the memory, and a host processor interface;

a host processor, coupled to the host processor interface of the shared memory interface, wherein the host processor monitors and responds to events indicated by transactions on the bus from other processing nodes to manage the transfer of data among the plurality of input/output paths and the indicated events comprise events which occur at the other processing nodes asynchronously relative to the transactions on the bus;

wherein a particular transaction on the bus for accessing the shared memory includes a plurality of bus transfers using the set of data and address lines, including a first bus transfer and one or more additional bus transfers, and the shared memory stores a list indicating actions in the set of processing nodes, and the particular transaction comprises an update to said list;

bus transaction logic, coupled with the set of processing nodes in the plurality of processing nodes, which supplies an event tag indicating that a transaction on the bus carries information about an event to be posted to the given processing node, and which during the particular transaction includes the event tag on a first subset of the set of data and address lines and address information for a location in the shared memory on a second subset of the set of data and address lines in the first bus transfer; and event posting logic, coupled with the shared memory interface, which posts the event in response to the event tag to the host processor for the transaction, and includes resources to synchronize posting of the event with a write to the shared memory of data from a last bus transfer of the additional bus transfer or transfers.

* * * * *